United States Patent
Barthel et al.

(10) Patent No.: US 7,418,647 B2
(45) Date of Patent: Aug. 26, 2008

(54) METHOD FOR DATA TRANSMISSION

(75) Inventors: Herbert Barthel, Herzogenaurach (DE); Frank Schiller, Nürnberg (DE); Edgar Sigwart, Amberg (DE)

(73) Assignee: Siemens Aktiengesellschaft, Munich (DE)

( * ) Notice: Subject to any disclaimer, the term of this patent is extended or adjusted under 35 U.S.C. 154(b) by 518 days.

(21) Appl. No.: 11/120,616

(22) Filed: May 3, 2005

(65) Prior Publication Data

US 2005/0273689 A1 Dec. 8, 2005

(30) Foreign Application Priority Data

May 10, 2004 (EP) .................... 04011104

(51) Int. Cl.
*H03M 13/00* (2006.01)
(52) U.S. Cl. ...................................... 714/758
(58) Field of Classification Search ................. 714/758, 714/746, 800; 370/442; 700/3
See application file for complete search history.

(56) References Cited

U.S. PATENT DOCUMENTS

| 5,724,370 A | 3/1998 | Sferrazza et al. |
| 6,418,349 B1* | 7/2002 | Hahn et al. .................... 700/3 |
| 2004/0198325 A1* | 10/2004 | Brueckner et al. ........ 455/412.1 |
| 2005/0232296 A1* | 10/2005 | Schultze et al. ............. 370/442 |

FOREIGN PATENT DOCUMENTS

| CN | 1681234 A1 | 10/2005 |
| DE | 41 07 639 A1 | 9/1992 |
| DE | 195 32 639 A1 | 2/1997 |
| DE | 198 33 867 A1 | 2/2000 |

* cited by examiner

*Primary Examiner*—Shelly A Chase

(57) ABSTRACT

A one-channel transmission of information on a bus system within an automation system is provided. Data transmission, in compliance with safety integrity level 2 according to IEC 618508, is achieved with reduced hardware outlay. The information to be transmitted via the bus system contains net data, which is present within a processing unit in two channels in the form of a first data set and in the form of a second data set that differs from the first data set at least in the form of representation. The processing unit generates a transmission telegram suitable for one-channel transmission on the bus system from the two data sets, whereby the net data present in the form of the first data set is stored in a first data area of the transmission telegram and a checksum generated on the basis of the second data set is stored in a second data area of the transmission telegram.

18 Claims, 2 Drawing Sheets

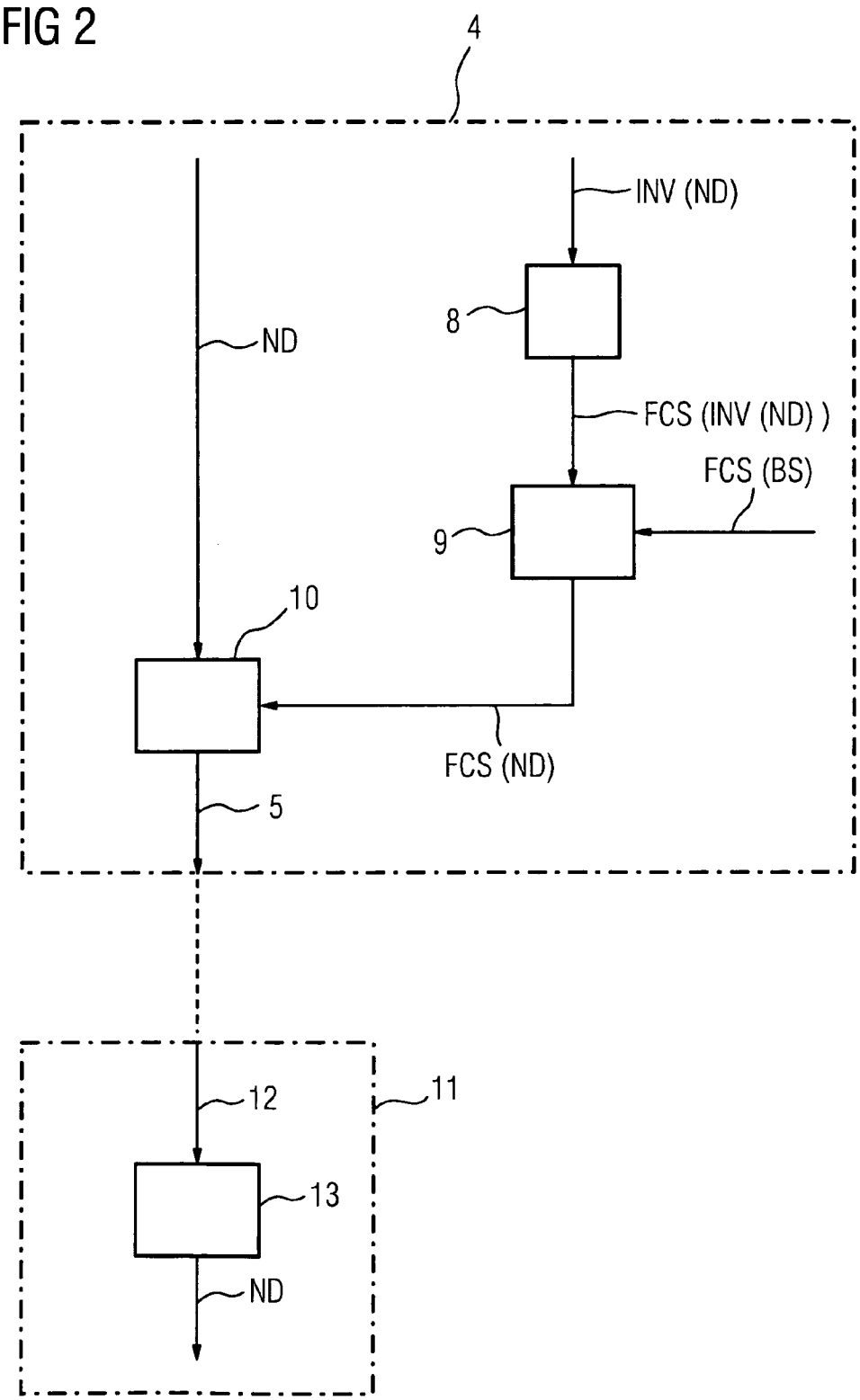

METHOD FOR DATA TRANSMISSION

CROSS REFERENCE TO RELATED APPLICATIONS

This application claims priority to the European application No. 04011104.9, filed May 10, 2004 and which is incorporated by reference herein in its entirety.

FIELD OF INVENTION

The invention relates to a method and a system for the one-channel transmission of information on a bus system, the information to be transmitted containing net data, which is present in two channels in the form of a first data set and in the form of a second data set that differs from the first data set at least in the form of representation.

BACKGROUND OF THE INVENTION

Such a system or method is for example used in industrial automation systems, in which safety-relevant data is maintained.

Known fail-safe systems are disclosed inter alia in standards such as IEC 61508 "Functional Safety of Electrical/Electronic/Programmable Electronic Safety-Related Systems". According to IEC 61508 in a fail-safe automation system measures must be taken to prevent error and control error according to a Safety Integrity Level (SIL).

To transmit safety-relevant data on a bus system a telegram is generated, which in addition to the pure net data to be transmitted also contains a checksum, which a recipient can use to check the transmitted net data for any errors. This checksum must always match the net data. If there is no such correspondence, this signals to the recipient that an error has occurred. The so-called Cyclic Redundancy Check (CRC) is implemented for example to generate the checksum.

To achieve a safety integrity level of 2 according to IEC 61508 in an automation system, all the safety-relevant data, in particular IO data, is maintained in duplicate. To transmit the data on the bus system according to the prior art a telegram is generated by a two-channel communication driver, in which the data present in both channels is used. To this end the data is provided by one of the two channels via a controller and the checksum is calculated and provided from the data of the other channel by means of a second controller. When the data leaves the communication driver for the bus, the telegram allows an error occurring in one of the two controllers that are redundant in respect of each other to be identified, by checking the correspondence of the checksum and the net data. This allows safety integrity level 2 to be achieved in the communication protocol, even though the two-channel data only appears/is present on a system with one-channel hardware.

SUMMARY OF THE INVENTION

The object of the invention is to specify a method and a system, with which a data transmission in compliance with safety integrity level 2 according to IEC 61508 is achieved with reduced hardware outlay.

This object is achieved by a method for transmitting information on a bus system within an automation system, the information to be transmitted via the bus system containing net data, which is present within a processing unit in two channels in the form of a first data set and in the form of a second data set that differs from the first at least in the form of representation, and the processing unit generates a transmission telegram suitable for one-channel transmission on the bus system from the two data sets, whereby the net data present in the form of the first data set is stored in a first data area of the transmission telegram and a checksum generated on the basis of the second data set is stored in a second data area of the transmission telegram.

This object is also achieved by a system for transmitting information within an automation system, having a bus system and a processing unit, the processing unit serving to generate a transmission telegram suitable for one-channel transmission on the bus system from a first data set and a second data set, the information to be transmitted containing net data, which is present within the processing unit in two channels in the form of the first data set and in the form of the second data set that differs from the first data set at least in the form of representation, whereby a first data area of the transmission telegram contains the net data present in the form of the first data set and a second data area of the transmission telegram contains a checksum generated on the basis of the second data set.

The method according to the invention allows the generation of a failsafe transmission telegram with only one processing unit, whereby safety integrity level 2 is nevertheless achieved. This is achieved in that the safety-relevant net data is not only maintained in duplicate until generation of the telegram but also in two different types of representation. If the data is always present in two different types of representation until telegram generation, it can also be maintained jointly in a common processing unit, e.g. a processor. Storage or processing errors (e.g. the "invert" command does not invert at a bit position) can be identified by the different form of representation of the net data, without a specific processing unit being required for the two forms of representation.

To generate the transmission telegram, the net data is represented by the first data set and the checksum is generated on the basis of the second data set. The method according to the invention thus allows the creation of checksums to safety integrity level 2 with one-channel hardware.

One advantageous embodiment of the method is characterized in that one of the two data sets corresponds to a bit-inverted representation of the net data and the checksum is generated by creating a second checksum from the inverted net data and linking this by means of an exclusive-OR operation to a checksum of a bit stream, in which all the bits are set to 1 and the length of which is defined as a function of the net data.

The two types of representation of the net data to be transmitted are defined in this embodiment in that the net data is maintained on the one hand in standard form and on the other hand in inverted form. The checksum of the net data is created on the basis of the inverted data. To this end a checksum of the inverted data is first created. A checksum of a bit stream is then calculated by setting all the bits to 1 and defining its length as a function of the length of the net data to be transmitted. The checksum of the bit stream is then linked by means of an exclusive-OR operation (XOR) to the checksum of the inverted net data. The result of this XOR link is ultimately the checksum of the actual net data.

This procedure has the crucial advantage that the net data maintained in duplicate is never present in the same form of representation in the processing unit until generation of the transmission telegram. If for example the inverted net data was inverted to generate the checksum of the net data and the checksum was then defined from this, the safety-relevant data would be present in the same form in both channels for a certain time. A number of possible storage and processing errors (e.g. the "invert" command does not invert at a bit position) cannot be identified as a result. The checksums are advantageously each created with a Cyclic Redundancy Check (CRC). Both the standard CRC and the variant of the CRC with appended zeros can hereby be used to create the checksum.

A microcontroller can be used as the processing unit to implement the method steps described. Alternatively the CRC algorithm can also be provided in the form of hardware using a switched shift register.

A typical area of application for the method is that of failsafe data transmission in an industrial automation system, in which the net data is safety-relevant data.

BRIEF DESCRIPTION OF THE DRAWINGS

The invention is described in more detail below with reference to the exemplary embodiments shown in the figures, in which:

FIG. 2 shows a diagram of an algorithm for generating a transmission telegram from data present in two channels using a one-channel communication driver.

DETAILED DESCRIPTION OF THE INVENTION

Figure 1:
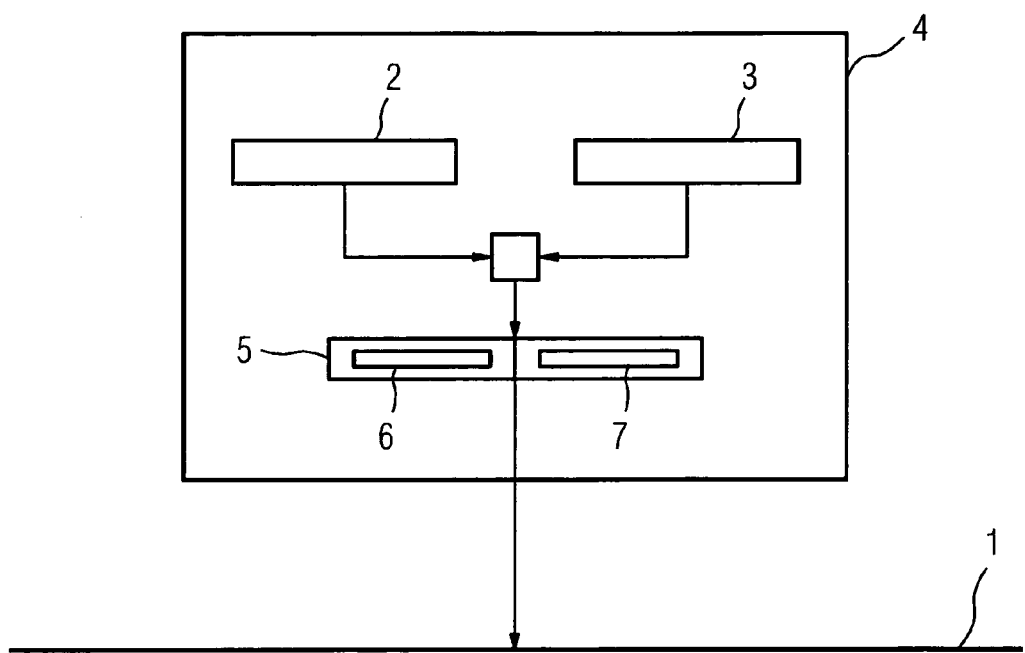
FIG. 1 shows an outline of the method for failsafe data transmission.

FIG. 1 shows an outline of the method for failsafe data transmission via a bus system 1. The net data to be sent via the bus system is present within a processing system 4 in two channels in the form of data sets 2,3 with different types of representation. These can for example be a standard representation of the net data on the one hand and an inverted representation of the net data on the other hand. The data sets 2,3 are for example detected by two sensors, which record the same measurement variable independently of each other, and supplied via separate data channels to the processing unit 4.

The processing unit 4 links the two data sets 2,3 to form a transmission telegram 5, which is sent in one channel via the bus system 1. To this end the net data represented by the first data set 2 is stored in a first data area 6 of the transmission telegram 5. In contrast, the checksum of the net data on the other hand is defined on the basis of the second data set 3, i.e. the inverted net data, and stored in a second data area 7 of the transmission telegram 5. This means that the data sets 2,3 of both channels are involved in the generation of the transmission telegram 5. The different type of representation of the net data in the two channels means that the communication driver can be provided in one-channel hardware, in particular using a single microcontroller.

FIG. 2 shows a diagram of an algorithm for generating a transmission telegram 5 from data present in two channels using a one-channel communication driver, as provided for example on the processing unit 4. The safety-relevant net data is present on the one hand in standard form ND and on the other hand also in inverted form INV(ND).

In a first method step 8 a checksum FCS(INV(ND)) is defined from the inverted net data INV(ND) using a Cyclic Redundancy Test (CRC). A checksum defined by a Cyclic Redundancy Test is abbreviated here and in the description which follows to FCSO (Frame Check Sequence).

In a second method step 9 an exclusive-OR operation (XOR) is carried out to link the checksum of the inverted net data FCS(INV(ND)) and a checksum FCS(BS) of a bit stream BS, in which all the bits are set to 1. The length of the bit stream BS is a function of the length of the net data ND. A checksum of the net data FCS(ND) results from the XOR link 9.

To generate the checksum of the net data FCS(ND) from the inverted net data INV(ND) therefore the inverted net data INV(ND) does not undergo inversion. Such a method step would cause the data of both channels to be present in the same representation form in the processing unit 4 for a time, resulting in the risk of unidentified storage or processing errors.

In a third processing step 10 the checksum FCS(ND) generated from the inverted net data INV(ND) is appended to the net data ND, to generate a transmission telegram 5. The transmission telegram 5 is transmitted via the bus system 1.

A recipient 11 receives a second transmission telegram 12, which corresponds to the transmission telegram 5, when transmission via the bus system 1 is error-free. In a fourth processing step 13 the recipient creates a checksum of the net data stored in the transmission telegram 12 and compares this with the checksum stored in the transmission telegram 12. If the two checksums correspond, the recipient can assume that the data was transmitted via the bus without error. Correspondence of the checksums also signals that the safety-relevant data to be transmitted was described correctly both by the net data ND and by the inverted net data INV(ND).

To summarize, the invention relates to a method and a system for the one-channel transmission of information on a bus system 1 within an automation system, with which a data transmission in compliance with safety integrity level 2 according to IEC 618508 is achieved with reduced hardware outlay. The information to be transmitted via the bus system 1 contains net data, which is present within a processing unit 4 in two channels in the form of a first data set 2 and in the form of a second data 3 set that differs from the first data set 2 at least in the form of representation. The processing unit generates a transmission telegram 5 suitable for one-channel transmission on the bus system 1 from the two data sets 2,3, whereby the net data present in the form of the first data set 2 is stored in a first data area 6 of the transmission telegram 5 and a checksum generated on the basis of the second data set 3 is stored in a second data area 7 of the transmission telegram 5.

The invention claimed is:

1. A method for transmitting information via a bus system within an automation system, the information to be transmitted via the bus system containing net data which is present within a processing unit on two channels in the form of a first data set and in the form of a second data set that differs from the first data set at least in the form of representation, and wherein the processing unit generates a transmission telegram suitable for one-channel transmission via the bus system from the two data sets, the method comprising:

storing the net data present in the form of the first data set in a first data area of the transmission telegram; and storing a checksum generated on the basis of the second data set in a second data area of the transmission telegram.

2. The method according to claim 1, wherein one of the two data sets corresponds to a bit by bit inverted representation of the net data and the checksum is generated by creating a second checksum from the inverted net data and linking the second checksum by an exclusive-OR operation to a checksum of a bit stream, in which all the bits are set to 1 and the length of the bit stream is defined as a function of the net data.

3. The method according to claim 2, wherein the checksums are each created with a Cyclic Redundancy Check.

4. The method according to claim 2, wherein a microcontroller is used as the processing unit.

5. The method according to claim 2, wherein the method is used for failsafe data transmission in an industrial automation system.

6. The method according to claim 1, wherein the checksums are each created with a Cyclic Redundancy Check.

7. The method according to claim 6, wherein a microcontroller is used as the processing unit.

8. The method according to claim 6, wherein the method is used for failsafe data transmission in an industrial automation system.

9. The method according to claim 1, wherein a microcontroller is used as the processing unit.

10. The method according to claim 9, wherein the method is used for failsafe data transmission in an industrial automation system.

11. The method according to claim 1, wherein the method is used for failsafe data transmission in an industrial automation system.

12. The method according to claim 11, wherein the failsafe data is safety-relevant data.

13. A system for the transmission of information within an automation system, comprising:
- a bus system for transmitting information; and
- a processing unit for generating a transmission telegram suitable for one-channel transmission on the bus system from a first data set and a second data set, wherein
- the information to be transmitted contains net data, which is present within the processing unit in two channels in the form of the first data set and in the form of the second data set that differs from the first data set at least in the form of representation, wherein
- a first data area of the transmission telegram contains the net data present in the form of the first data set, and
- a second data area of the transmission telegram contains a checksum generated on the basis of the second data set.

14. The system according to claim 13, wherein the processing unit serves to create the checksum stored in the second data area, wherein one of the two data sets corresponds to a bit by bit inverted representation of the net data, and wherein the checksum is generated by creating a second checksum from the inverted net data and by linking the second checksum by means of an exclusive-OR operation to a checksum of a bit stream, in which all the bits are set to 1 and the length of which is defined as a function of the net data.

15. The system according to claim 13, wherein the processing unit serves to create the checksums with a Cyclic Redundancy Check in each instance.

16. The system according to claim 13, wherein the processing unit is configured as a microcontroller.

17. The system according to claim 13, wherein the system is used for failsafe data transmission in an industrial automation system.

18. The system according to claim 13, wherein the net data is safety-relevant data.

* * * * *